United States Patent [19]

Huggins et al.

[11] Patent Number: 4,908,510

[45] Date of Patent: Mar. 13, 1990

[54] OPTICAL FIBER COUPLED RESOLVER HAVING A REFERENCE SIGNAL

[75] Inventors: Raymond W. Huggins, Mercer Island; Glen E. Miller, Redondo, both of Wash.

[73] Assignee: The Boeing Company, Seattle, Wash.

[21] Appl. No.: 239,629

[22] Filed: Sep. 2, 1988

[51] Int. Cl.[4] .............................................. G01D 5/34
[52] U.S. Cl. ................................ 250/231.13; 250/229
[58] Field of Search ............ 250/231 SE, 227, 211 K, 250/229, 237 R, 237 G; 350/96.10, 96.18, 96.20, 96.24; 356/374

[56] References Cited

U.S. PATENT DOCUMENTS

| | | | |
|---|---|---|---|
| 3,586,665 | 6/1971 | Weyrauch | 250/231 |
| 3,892,961 | 7/1975 | Bachmann | 250/211 K |
| 3,912,926 | 10/1975 | Coulbourn | 250/231 SE |
| 3,950,099 | 4/1976 | Malueg | 356/28 |
| 4,096,383 | 6/1978 | Mancini et al. | 250/227 |
| 4,326,128 | 4/1982 | Klein | 250/231 SE |
| 4,547,667 | 10/1985 | Sasaki et al. | 250/231 SE |
| 4,580,046 | 4/1986 | Sasaki et al. | 250/231 SE |
| 4,580,047 | 4/1986 | Sasaki et al. | 250/231 SE |
| 4,680,466 | 7/1987 | Kuwahara et al. | 250/231 SE |
| 4,767,925 | 8/1988 | Kawamoto | 250/231 SE |

FOREIGN PATENT DOCUMENTS

| | | | |
|---|---|---|---|
| 2592960 | 7/1987 | France | 250/231 SE |
| 0048616 | 3/1984 | Japan | 250/231 SE |
| 0076612 | 5/1985 | Japan | 250/231 SE |
| 0203814 | 10/1985 | Japan | 250/231 SE |

*Primary Examiner*—Frank Gonzalez
*Attorney, Agent, or Firm*—Indyk, Pojunas & Brady

[57] ABSTRACT

An optical encoder produces a reference signal and compensates for any instability in intensity of a light source which reads the encoder. The optical encoder comprises a movable encoding element having an analog track of variable transmissivity, and a chopping element for alternately transmitting light from the source through the analog track and around the analog track. Light transmitted through the analog track comprises an information signal and light transmitted around the analog track comprises the reference signal. The chopping element comprises an optical switch or a rotatable or stationary element havnig an alternating series of opaque and transparent sections.

22 Claims, 4 Drawing Sheets

OPTICAL FIBER COUPLED RESOLVER HAVING A REFERENCE SIGNAL

The invention relates to an optical resolver, and more specifically, to an optical resolver for producing an information signal and a reference signal.

BACKGROUND OF THE INVENTION

Encoders have been used to indicate the position or angle of different movable elements, such as the position of a hydraulic piston or the angle of an aircraft wing flap. Electrical encoders have been used, which vary the potential of an electrical signal in a manner that relates to the position or angle of such a movable element. Optical encoders have been used, which modulate the intensity of a light beam in a manner that relates to the position or angle of the movable element.

Electrical encoders are currently used to indicate the position or angle of different control surfaces of many types of aircraft. These electrical encoders, however, are subject to the effects of electromagnetic interference. Electromagnetic interference can cause an electrical encoder to inaccurately indicate the position of a control surface which would affect the flying capability of the aircraft.

Optical encoders are preferable to electrical encoders, because optical encoders are less sensitive to the effects of electromagnetic radiation than electrical encoders. Optical encoders have optical fibers which are capable of carrying much more information than electrical conductors of electrical encoders. Also, optical encoders are lighter in weight and more reliable than electrical encoders. The accuracy of optical encoders, however, has been limited by the stability of the intensity of a light beam which reads the optical encoder.

The inventors have found that optical encoders can be provided with a reference beam and a signal beam using wavelength division multiplexing. These two beams having different wavelengths are transmitted through a common fiber. However, two light sources are required and intensities and wavelengths of these two sources will usually differ with temperature. Passband filters have been used by the inventors to separate the two beams, but transmission coefficients of these filters are not constant with wavelength. Accuracy of the encoder is degraded when source peak wavelengths vary with temperature. Such degradation occurs when light emitting diodes are used, for instance.

Optical encoders have digital or analog encoding tracks. Digital encoding tracks comprise a number of discrete binary tracks arranged in a binary coded decimal or Gray code configuration. A plurality of light sources scan separate beams onto each binary track to read the digital encoding track. The plurality of sources increases the complexity of a digital optical encoder.

Analog encoding tracks comprise a single track having a transmissivity that varies linearly or sinusoidally along the track, for instance. A single light beam passes through the single track to read the analog encoding track.

Electrical encoders and optical encoders typically comprise linear or rotary encoders. A linear encoder comprises a slide on a barrel of a hydraulic piston, for instance. The encoder slide moves longitudinally as the hydraulic piston barrel extends. A detector senses the position of the slide and produces a signal indicating the position of the hydraulic piston. A rotary encoder comprises a disk which connects directly to a wing flap, for instance. The encoder disk rotates as the angle of the wing flap changes. A detector senses the position of the encoder disk and produces a signal indicating the position of the wing flap.

Thus, a need exists for an optical encoder, which is not only insensitive to the effects of electromagnetic interference, but is able to compensate for the instability of intensity of a light beam which reads the optical encoder without using wave division multiplexing.

SUMMARY OF THE INVENTION

The invention concerns an optical encoder comprising a movable element having a means for modulating light, and a means for alternately transmitting light through first and second paths. The first path by-passes the means for modulating light and the second path includes the means for modulating light.

One embodiment of the optical encoder comprises an encoder disk having an analog track of varying transmissivity. The optical encoder also comprises a chopping element which alternately transmits light as a reference signal through an optically clear path and as an information signal through the analog track. This embodiment produces an optical reference signal to compensate for instabilities in intensity of a light beam which reads the optical encoder. The optical encoder also uses an optical chopping element to avoid the effects of changes in the fiber transmission paths including variable and non-repeatable connector losses on the optical encoder measurement. The optical encoder produces the reference signal without using wavelength division multiplexing.

BRIEF DESCRIPTION OF THE FIGURES

FIG. 1b illustrates the relative intensities of the reference signal and the information signal produced by the optical resolver of FIG. 1a.

FIG. 2b shows a top view of the chopping disk of FIG. 2a.

FIG. 2d illustrates the relative intensities of the reference signal and the information signal produced by the optical resolver of FIG. 2a.

FIG. 4b shows a detailed view of the stationary chopping element of FIG. 4a.

FIG. 4c shows a detailed view of the rotary encoder disk of FIG. 4a.

FIG. 4d illustrates the relative intensities of the reference signal and the information signal produced by the optical resolver of FIG. 4a.

DETAILED DESCRIPTION OF THE INVENTION

Figure 1A:
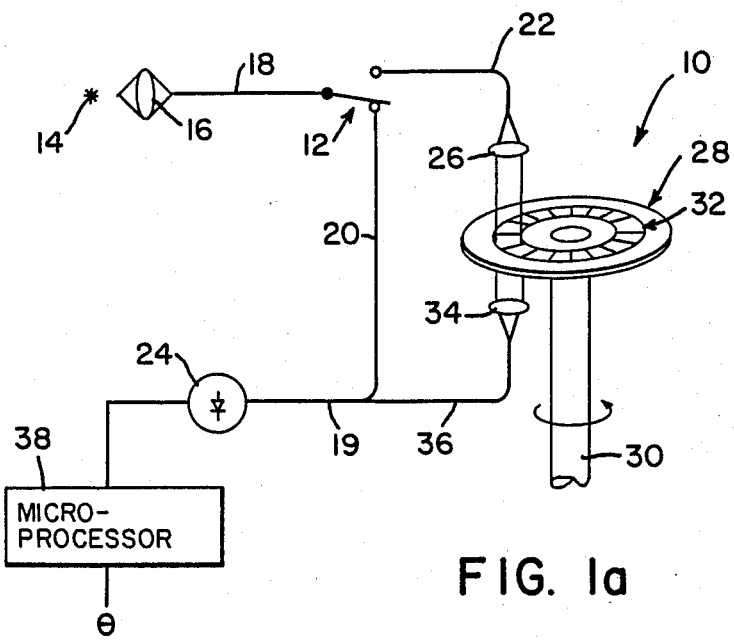
FIG. 1a shows an optical resolver having an optical switch for alternately producing a reference signal and an information signal.

FIG. 1a shows an optical resolver 10 having an optical switch 12 for alternately producing a reference signal and an information signal. The reference signal is used to compensate for instabilities in intensity of a light source 14 and the information signal is modulated in a manner relating to the position of a movable element, as discussed below.

An light source 14 generates light to a collecting lens 16. The collecting lens 16 collects the light and focuses the light onto an optical fiber 18. Alternatively, the light source 14 comprises a laser which directs a light beam directly onto the optical fiber 18.

The optical fiber 18 carries the light beam to an optical switch 12. The optical switch 12 alternately transmits the light beam to one of two optical fibers 20 or 22. The optical switch 12 comprises, for instance, an electro-mechanical device that alternately aligns the optical fiber 18 with one of the optical fibers 20 or 22.

Optical fiber 20 carries a pulsed light beam because the optical fiber 20 is alternately connected to and disconnected from the light source 14 by the optical switch 12. The pulsed light beam carried by the optical fiber 20 comprises a reference signal. An optical fiber 19 carries the reference signal to a detector 24 from fiber 20. The intensity of the reference signal is relatively constant, but changes with any change in intensity of the light generated by an unstable light source 14 or by changes in the losses in the connecting fibers 18 or 19, for instance. According to this invention, the reference signal is used in compensating for any such instability of a light source, or for changes in connecting fibers 18 or 19. Fiber link losses change when optical fibers are subject to microbending, connector uncoupling and recoupling, nuclear radiation, and water vapor absorption, for instance.

Optical fiber 22 carries a pulsed light beam because this optical fiber 22 is alternately connected to and disconnected from the light source 14 by the optical switch 12. The pulsed light beam carried by the optical fiber 22 comprises an information signal. The optical fiber 22 carries the information signal to a collimating lens 26. The collimating lens transmits the information signal through an encoder disk 28. The encoder disk 28 is integral with an encoder shaft 30.

The encoder shaft 30 connects to a wing flap of an aircraft, which is not shown, for instance. Angular movement of the wing flap rotates the encoder shaft 30, which rotates the integrally connected encoder disk 28. The rotational angle of the encoder shaft 30 and encoder disk 28 are related to the angular position of the wing flap, for instance.

The encoder disk 28 has an analog track 32 comprising an opaque material which is deposited as an annular band on the surface of the encoder disk 28. The material is deposited on the encoder disk 28 and has a density that increases the opacity of the analog track 32 with the angular position of the encoder disk 28.

U.S. Pat. Application Ser. No. 131,664, filed Dec. 11, 1987(still pending), for a Continuously Variable Neutral Density Light Transmission Filter and Analog Position Sensor, describes deposition of such a material on an encoder disk, and is assigned to the assignees of this invention. The specification of Ser. No. 131,664 is incorporated by reference.

The light beam comprising the information signal is transmitted through a small area of the opaque material comprising the analog track 32 and is attenuated according to the density of the material in that area. The information signal is transmitted through a more dense area of the analog track 32 after the encoder disk 28 is rotated by movement of a wing flap, for instance. This more dense area further attenuates the information signal. Thus, the information signal is modulated in intensity according to the rotational angle of the encoder disk 28.

A collecting lens 34 focuses the information signal modulated by the encoder disk 28 onto an optical fiber 36. The optical fiber 36 carries the information signal to fiber 19 and thence to the detector 24. The detector 24 comprises a photo sensitive diode, for instance, and senses the information signal which has been modulated in a manner relating to the rotational angle of the encoder disk 28. The detector 24 produces an output signal indicating the angular position of the wing flap, for instance.

Figure 1B:
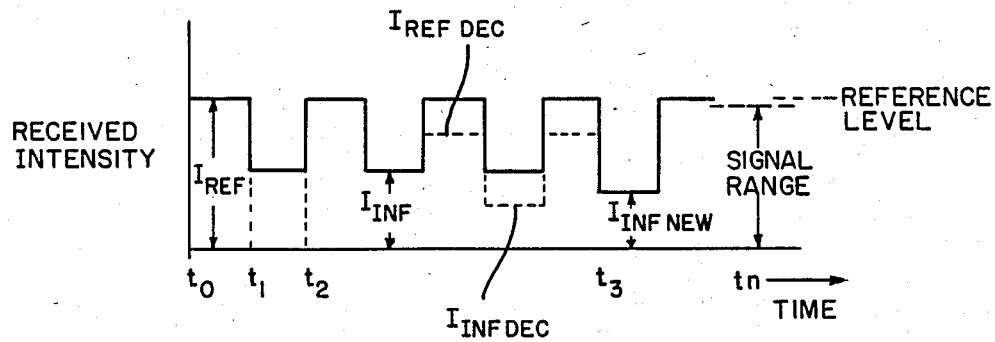

FIG. 1b illustrates the relative intensities of the reference signal and the information signal produced by the optical resolver of FIG. 1a and as sensed by the detector 24. Time is plotted on the horizontal axis and intensity on the vertical axis.

The optical switch 12 alternately transmits light comprising the reference signal through the optical fiber 20, by-passing the analog track 32, and light comprising the information signal through the analog track 32 of the encoder disk 28. For simplicity, the rotatable encoder disk 28 and integral encoder shaft 32 are considered to be stationary.

At $t_0$, the optical switch 12 is set to transmit light from the source 14 through the optical fiber 20, for instance. From $t_0$ to $t_1$, the detector 24 senses a light beam of amplitude $I_{Ref}$ which indicates the intensity of the reference signal. The amplitude of $I_{Ref}$ is relatively high, because the reference signal has been only slightly attenuated by the optical fiber 20. At $t_1$, the optical switch 12 switches to transmit light from the source 14 through the analog track 32 on the encoder disk 28. For simplicity the optical switch 12 is assumed to switch fiber 18 between fibers 20 and 22 instantaneously. From $t_1$ to $t_2$, the detector 24 senses a light beam of amplitude $I_{Inf}$ which indicates the intensity of the information signal. The amplitude of $I_{Inf}$ is relatively low, because the information signal has been attenuated by the material comprising the analog track 32. At $t_2$, the optical switch 12 switches to again transmit light from the source 14 through the optical fiber 20 and the detector 24 senses a light beam having an intensity of amplitude $I_{Ref}$. At each time $t_n$, the optical switch 12 switches and the intensity of light sensed by the detector 24 alternates between $I_{Ref}$ and $I_{Inf}$.

Figure 5:
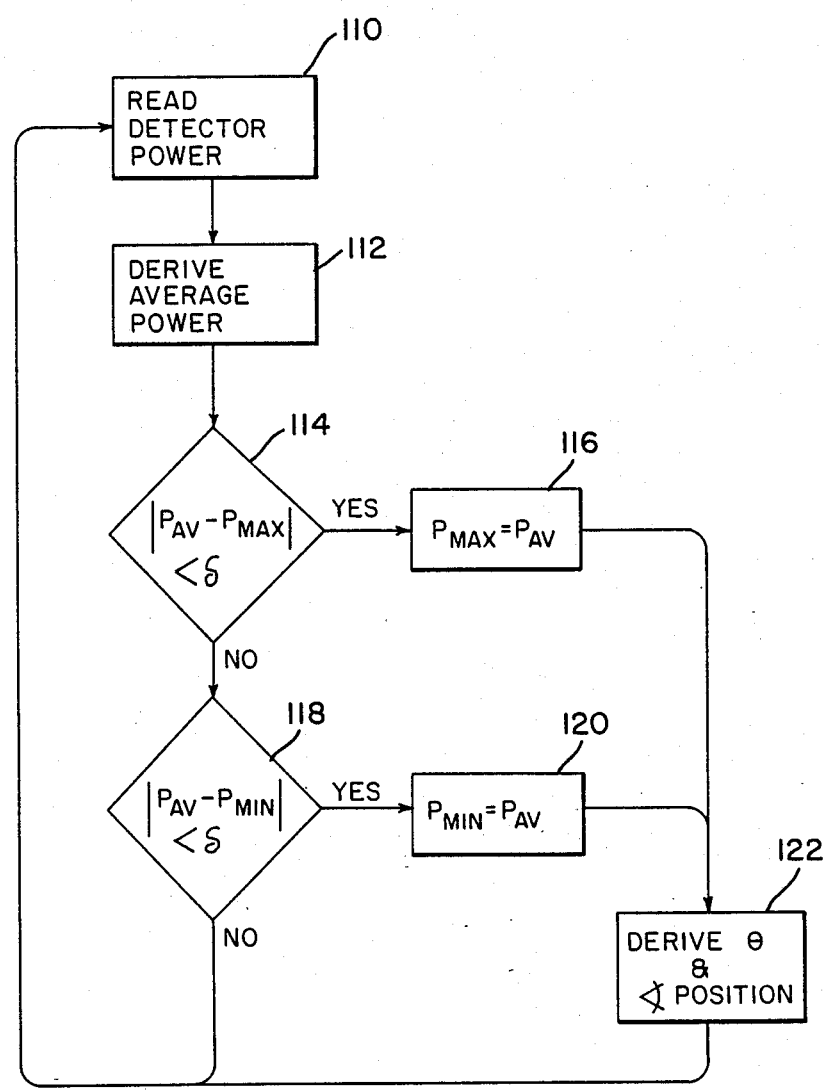
FIG. 5 illustrates the steps performed by a microprocessor in deriving the angular position of the optical resolver of this invention.

The detector 24 of FIG. 1a produces an output signal relating to the intensities of the reference signal $I_{Ref}$ and information signal $I_{Inf}$ of FIG. 1b. A microprocessor 38 receives the output signal from the detector 24 and derives the rotational position of the encoder disk 28 and the angular position of a wing flap in light of the difference between these intensities, for instance. The microprocessor 38 comprises an INTEL-8088, an INTEL-8051, or a Motorola 68000, for instance. FIG. 5 illustrates the steps performed by the microprocessor 38.

Light sources aboard aircraft are generally powered by electrical systems which are subject to the effects of electromagnetic interference. Such interference causes a light source to generate light of varying intensity. An optical encoder aboard an aircraft would incorrectly indicate a change in wing flap position in response to a varying intensity of light from a source, for instance. This invention compensates for any instability in the intensity of light from a light source.

When the intensity of light from a source varies, the intensity of light transmitted through optical fibers 18, 19, 20, and 22 varies a similar amount. If the intensity of the light from the source 14 decreases, the intensity of light comprising the $I_{Ref}$ signal decreases to $I_{Refdec}$ and the intensity of light comprising the $I_{Inf}$ signal also decreases to $I_{Infdec}$, for instance. However, the ratio of intensities of the $I_{Ref}$ signal and the $I_{Inf}$ signal remains substantially constant despite any variation in intensity of light from the source 14. It is this ratio which the microprocessor 38 derives in compensating for light source instabilities or changes in the connecting fiber losses, thus accurately determining the rotational position of the encoder disk 28.

The movement of a wing flap at time $t_3$ rotates the encoder shaft 30, for instance. For simplicity, this movement and rotation are considered to be instantaneous. The encoder shaft 30 rotates the integral encoder disk 28 and the analog track 32 rotates with the encoder disk 28. After the analog track 32 rotates, light is transmitted from collimating lens 26 through another portion of the analog track 32 to the collecting lens 34. This portion of the analog track 32 has a greater density of opaque material than a first portion of the analog track 32, for instance. The greater density of opaque material further attenuates the information signal transmitted through the analog track 32. Accordingly, the intensity of the information signal decreases and the intensity of the light beam sensed by the detector 24 falls to $I_{Infnew}$.

This signal $I_{Infnew}$ indicates that the encoder disk 28, and thus the wing flap, has a new position. The microprocessor 38 derives the new position of the encoder disk 28 and the angular position of the wing flap. A display instrument, which is not shown, indicates this new position of the wing flap to a pilot, for instance.

Figure 2A:
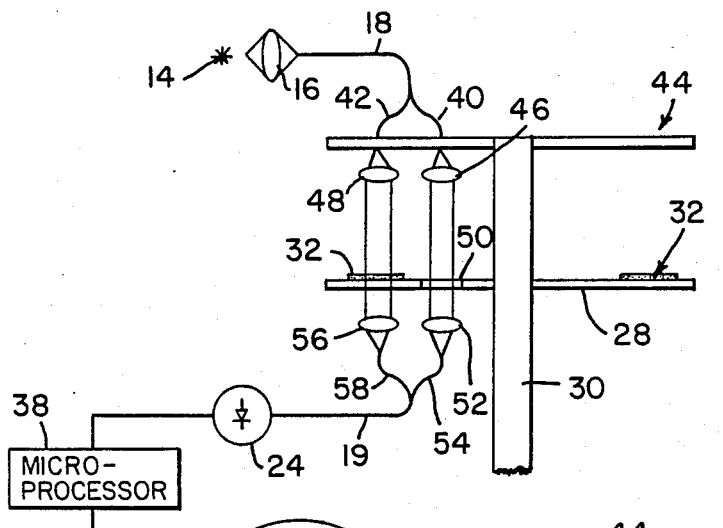
FIG. 2a shows an optical resolver having a rotary chopping disk for alternately producing a reference signal and an information signal.

FIG. 2a shows an optical resolver having a rotary encoding disk and a rotary chopping disk for alternately producing a reference signal and an information signal. The chopping disk 44 alternately transmits light comprising a reference signal through an optically clear track 50 on the encoder disk 28 and light comprising an information signal through the analog track 32 of the encoder disk 28, as discussed below. Elements which are the same in FIGS. 1a and 2a have the same numbers.

A light source 14 generates light to a collecting lens 16. The collecting lens 16 collects the light and focuses the light onto an optical fiber 18. The optical fiber 18 branches into two optical fibers 40 and 42, both of which carry light from the source 14 to a chopping disk 44. The chopping disk 44 is integral with the encoder shaft 30. The chopping disk 44 alternately transmits the light from the optical fibers 40 or 42 to respective collimating lenses 46 or 48, as discussed below.

Figure 2B:
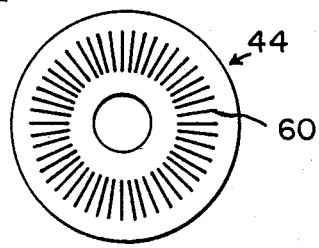

FIG. 2b shows a top view of the chopping disk 44 of FIG. 2a. The chopping disk 44 has radial, opaque segments 60 which extend radially on the surface of the chopping disk 44. The opaque segments 60 block light alternately from the optical fibers 40 or 42.

Figure 2C:
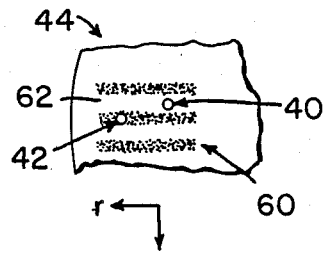
FIG. 2c shows a detail view of the chopping disk of FIGS. 2a and 2b.

FIG. 2c shows a detailed view of the chopping disk 44 of FIGS. 2a and 2b and the relative positions of the optical fibers 40 and 42. The optical fiber 40 and the optical fiber 42 are staggered angularly over the opaque segments 60 on the chopping disk 44, for instance. Between adjacent opaque segments 60, the chopping disk 44 has optically clear portions 62 The optically clear portions 62 transmit light alternately from the optical fibers 40 or 42. Alternatively, the chopping disk 44 comprises a transparent material, onto which the opaque segments 60 have been deposited.

Each opaque segment 60 and clear segment 62 is slightly wider than the diameter of either optical fiber 40 or 42. Each opaque segment 60 is slightly longer than the distance between the two optical fibers 40 and 42. The opaque segments 60 and optically clear portions 62 are dimensioned and positioned on the chopping disk 44 to pass sequentially under the optical fibers 40 and 42 when the chopping disk 44 rotates. Thus, the light from the optical fiber 40 is transmitted through one optically clear portion 62 of the chopping disk 44 when all of the light from the optical fiber 42 is blocked by one opaque segment 60 of the chopping disk 44, for instance.

The collimating lens 46 of FIG. 2a receives a pulsed light beam from the optical fiber 40, because light from the optical fiber 40 is alternately transmitted and blocked by the chopping disk 44. The light beam carried by the optical fiber 40 and the pulsed light beam received by the collimating lens 46 comprise a reference signal.

The collimating lens 46 transmits the reference signal through an encoder disk 28. The encoder disk 28 has an optically clear track 50 comprising an annular band on the surface of the encoder disk 28, for instance. The light beam comprising the reference signal is transmitted through the clear track 50. The intensity of the reference signal is relatively constant, but changes with any change in intensity of the light generated by an unstable light source 14 or changes in the losses of connecting fibers 18 or 19, for instance. According to this invention, the reference signal is used in compensating for any such instability of a light source, or fiber link losses.

A collecting lens 52 collects the reference signal transmitted through the clear track 50 and focuses the light onto an optical fiber 54 which is coupled to fiber 19. The optical fiber 19 carries the reference signal to a detector 24. The detector 24 senses this reference signal, which has by-passed the analog track 32 on the encoder disk 28.

The collimating lens 48 receives a pulsed light beam from the optical fiber 42, because light from this optical fiber 42 is alternately transmitted and blocked by the chopping disk 44. The light beam carried by the optical fiber 42 and the pulsed light beam received by the collimating lens 48 comprise an information signal.

The collimating lens transmits the information signal through an encoder disk 28. The encoder disk 28 has an analog track 32 comprising a material which is deposited as an annular band on the surface of the encoder disk 28. The material is deposited on the encoder disk 28 and has a density that increases the opacity of the angular track 32 with the angular position of the encoder disk 28. The light beam comprising the information signal is transmitted through a small area of the material comprising the analog track 32 and is attenuated according to the density of the material in that area. The information signal is transmitted through a less dense area of the analog track 32 after the encoder disk 28 is rotated by movement of a wing flap, for instance. This less dense area attenuates the information signal less.

Thus, the information signal is modulated in intensity according to the rotational angle of the encoder disk 28.

A collecting lens 56 focuses the information signal modulated by the encoder disk 28 onto the optical fiber 58. The optical fiber 58 is joined to fiber 19 which carries the information signal to the detector 24. The detector 24 senses the information signal which has been modulated in a manner related to the rotational angle of the encoder disk 28. A detector 24 produces an output signal to the microprocessor 38 of FIG. 1a, which derives the angular position of the wing flap, for instance.

Figure 2D:
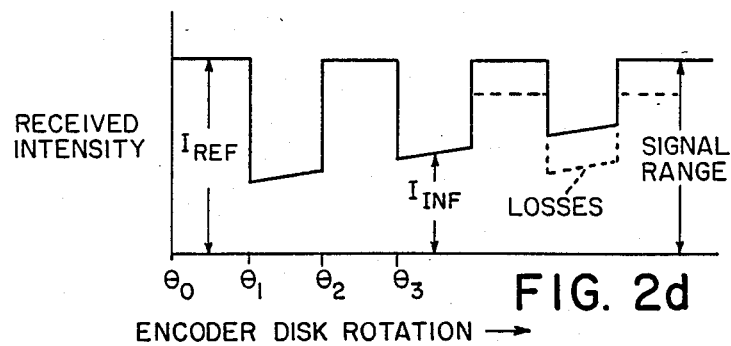

FIG. 2d illustrates the relative intensities of the reference signal and the information signal produced by the optical resolver of FIG. 2a. The intensities of these signals are plotted on the vertical axis and the angle of rotation $\Theta$ of the encoder disk 28 is plotted on the horizontal axis.

If the width of the opaque and clear segments 60 and 62 is only slightly greater than the core diameter of optical fibers 40 or 42, the resultant waveforms will be approximately sinusoidal. Ideally, the width of the sectors comprising the opaque and clear segments 60 and 62 would be several times greater than the core diameter of the optical fibers 40 or 42. This would then provide a trapezoidal waveform, that is, the waveform would have substantially flat tops and bottoms as shown in FIG. 2d. Also, the width of the sectors comprising the segments 60 and 62 would, ideally, be much smaller than the required resolution of the sensor. If these two conditions are not compatible, gearing should be included to permit the chopper to rotate at a higher velocity than the encoder.

The encoder disk 28 is positioned at angle $\Theta_0$ and light is transmitted through the optically clear portions 62 on the chopping disk 44 and the clear track 50 on the encoder disk 28. This reference signal has a constant intensity $I_{Ref}$ if there is no instability in the light source, or fiber link losses.

At angle $\Theta_1$, the encoder disk 28 has rotated approximately one-half of a chopping period. The reference signal is now blocked by the opaque segments 60 of the chopping disk 44. However, light comprising the information signal is transmitted by the optically clear portions 62 of the chopping disk 44. For simplicity, the chopping disk 44 is assumed to switch to instantaneously between the transmission at the reference signal from the optical fiber 40 and the information signal from the optical fiber 42. Rotation of the encoder disk 28 continues and intensity $I_{Inf}$ of the information signal increases as different portions of increasing transmissivity of the analog track 32 rotate under the optical fiber 42 carrying the information signal. For simplicity, this increase in intensity of $I_{Inf}$ is shown as a ramp function.

At $\Theta_2$, the encoder disk has rotated until the optically clear portions 62 of the chopping disk 44 again transmit the reference signal through the clear track 50 on the encoder disk 28 and the opaque segments 60 of the chopping disk 44 block the information signal. Instability of a light source or fiber link losses would shift the signals $I_{Ref}$ and $I_{Inf}$ to the dashed line of FIG. 2d, in a manner similar to that described concerning the graph of FIG. 1d.

Movement of a wing flap rotates the encoder shaft 30 to $\Theta_3$, for instance. The encoder shaft 30 rotates the integral encoder disk 28 and the analog track 32 rotates with the encoder disk 28. After the analog track 32 rotates, light is transmitted from collimating lens 48 through another portion of the analog track 32 to the collecting lens 56. This portion of the analog track 32 has a lesser density of opaque material than a first portion of the analog track 32, for instance. The lesser density of opaque material transmits more of the information signal through the analog track 32. Accordingly, the intensity of the information signal increases and the intensity of the light beam sensed by a detector increases. A detector such as detector 24 of FIG. 1a produces an output signal relating to the increased intensity of the information signal. The microprocessor 38 of FIG. 1a receives this signal from the detector and derives a new angular position of a wing flap, for instance.

Figure 3:
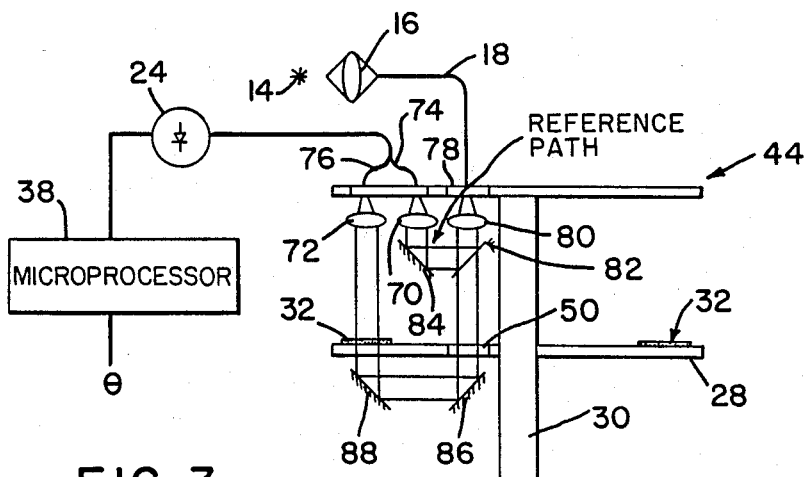
FIG. 3 shows an optical resolver having a rotary chopping disk and a beam splitter for alternately producing a reference signal and an information signal.

FIG. 3 shows an optical resolver having a rotary chopping disk and a beam splitter for alternately producing a reference signal and an information signal. A clear track 78 of the chopping disk 44 transmits light comprising a reference signal to a reflector and back through the chopping disk 44, and light comprising an information signal through the clear track 50 on the encoder disk 28 and through the analog track 32 on the encoder disk 28 and back through the chopping disk 44, as discussed below. Elements which are the same in FIGS. 2a and 3 have the same numbers.

A light source 14 generates light to a collecting lens 16. The collecting lens 16 collects the light and focuses the light onto an optical fiber 18. The optical fiber 18 carries light from the source 14 to a chopping disk 44. The chopping disk 44 is integral with the encoder shaft 30. The chopping disk 44 alternately transmits the light from two collecting lenses 70 or 72 to respective optical fibers 74 or 76.

The chopping disk 44 has an inner annular band 78 of transparent material. The optical fiber 18 transmits light from the source 14 through this transparent annular band 78 to a collimating lens 80. The collimating lens 80 transmits the light to a beam splitter 82 which directs the light in two paths.

The beam splitter 82 directs light comprising a reference signal in one path toward a reflector 84. The reflector 84 re-directs the light to the collecting lens 70. The collecting lens 70 transmits the light back through the chopping disk 44, by-passing the analog track 32 on the encoder disk 28, to the optical fiber 74.

The chopping disk 44 has radial, opaque segments and optically clear portions arranged in an annular pattern on the surface of the chopping disk 44 outside the annular band 78 of transparent material. Such segments are similar to the opaque segments 60 and clear portions 62 of FIG. 2b. The opaque segments and optically clear portions of the chopping disk 44 are dimensioned and positioned to pass under the optical fiber 74 when the chopping disk 44 rotates. These opaque segments and clear portions alternately block and transmit the reference signal to the optical fiber 74.

The optical fiber 74 receives a pulsed light beam comprising the reference signal from the collecting lens 70, because light from the collecting lens 70 is alternately transmitted and blocked by the chopping disk 44. Fiber 74 is coupled to fiber 19 which transmits light to detector 24. A detector 24 senses this reference signal.

The beam splitter 82 directs light as an information signal in another path through an encoder disk 28. The encoder disk 28 has an optically clear track 50 comprising an inner annular band on the surface of the encoder disk 28, for instance. The beam splitter 82 transmits the information signal through the clear track 50 to a reflector 86. The reflector 86 re-directs the light to a reflector 88, which then re-directs the light back through the encoder disk 28.

The encoder disk 28 has an analog track 32 comprising a material which is deposited as an annular band on the surface of the encoder disk 28. The material is deposited on the encoder disk 28 in a density that increases the opacity of the analog track 32 with the angular position of the encoder disk 28, for instance. The light beam comprising the information signal is transmitted through a small area of the material comprising the analog track 32 and is attenuated according to the density of the material in that area. The information signal is transmitted through a more dense area of the analog track 32 after the encoder disk 28 is rotated by movement of a wing flap, for instance. Thus, the information signal is modulated in intensity according to the rotational angle of the encoder disk 28.

A collecting lens 72 collects the information signal transmitted through the clear track 50 and the analog track 32, and transmits the information signal back through the chopping disk 44 and onto an optical fiber 76. This optical fiber 76 and the optical fiber 74, which carries the reference signal, are staggered angularly over the opaque segments on the chopping disk 44, for instance. The opaque segments and optically clear portions of the chopping disk 44 are dimensioned and positioned to pass sequentially over the optical fibers 74 and 76 when the chopping disk 44 rotates.

The optical fiber 76 receives a pulsed light beam from the focussing lens 72, because light from the collecting lens 72 is alternately transmitted and blocked by the chopping disk 44. The optical fiber 76 is coupled to fiber 19 which carries the information signal to a detector 24. The detector 24 senses this information signal, which has been modulated in a manner related to the rotational angle of the encoder disk 28. The detector 24 produces an output signal indicating the intensity of the information signal. The microprocessor 38 of FIG. 1a derives the angular position of the wing flap, for instance.

Movement of a wing flap rotates the encoder shaft 30, for instance. The encoder shaft 30 rotates the integral encoder disk 28 and the analog track 32 rotates with the encoder disk 28. After the analog track 32 rotates, light is transmitted from collimating lens 80 through another portion of the analog track 32 to the collecting lens 72. This portion of the analog track 32 has a greater density of material than a first portion of the analog track 32, for instance. The greater density of material further attenuates the information signal transmitted through the analog track 32. Accordingly, the intensity of the information signal decreases and the intensity of the light beam sensed by the detector 24 decreases. The detector 24, produces an output signal indicating the decreased intensity of the information signal. The microprocessor 38 of FIG. 1a receives this signal and derives a new position of a wing flap, for instance.

Figure 4A:
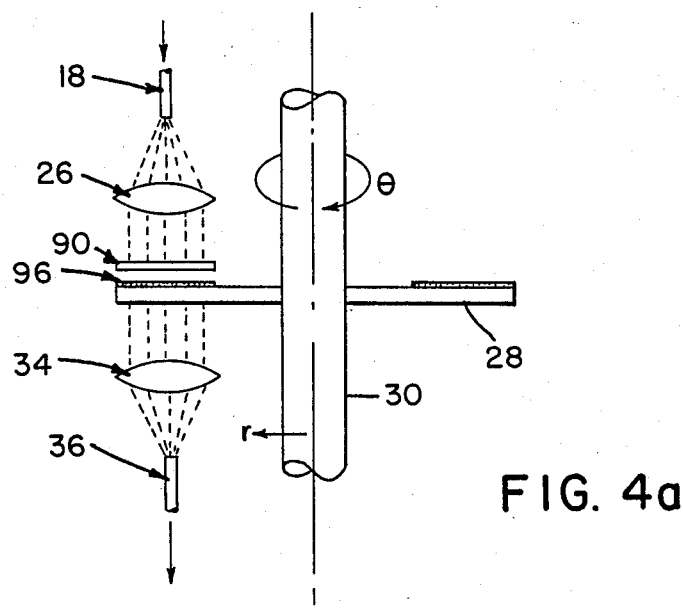
FIG. 4a shows an optical resolver having a rotary encoder disk and a stationary chopping element for alternately producing a reference signal and an information signal.

FIG. 4a shows an optical resolver having a rotary encoding disk 28 and a stationary chopping element 90 for alternately producing a reference signal and an information signal, as discussed below. Elements which are the same in FIGS. 1a and 4a have the same numbers.

An optical fiber 18 carries light from a source, not shown, to a collimating lens 26. The collimating lens 26 transmits this light to the stationary chopping element 90. The stationary chopping element 90 is secured to the structure of the sensor and is stationary relative to the optical fiber 18 and the collimating lens 26, for instance.

Figure 4B:
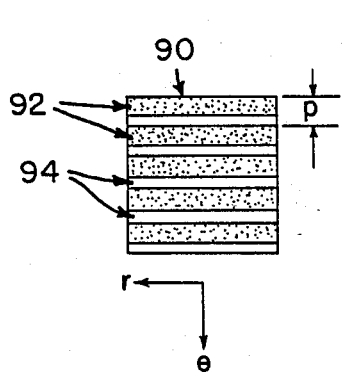

FIG. 4b shows a detail view of the stationary chopping element 90 of FIG. 4a. The stationary chopping element 90 comprises a surface having a pattern of opaque regions 92 and transmissive regions 94. Ideally, these regions are perfectly opaque and perfectly transmissive, respectively. Each opaque region 92 is substantially wider than each transmissive region 94 to provide a sharp transition between the reference signal and the information signal. Each opaque region 92 is paired with one transmissive region 94 in a uniform period "P". For simplicity, these regions are shown as rectangular areas. However, these regions 92 and 94 comprise sectors which extend radially from the rotatable encoder shaft 30.

The transmissive regions 94 transmit light from the collimating lens 26 to the rotatable encoder disk 28. The encoder disk 28 comprises a surface having an encoded track 96. The encoder disk 28 is integral with the encoder shaft 30 and is positioned on this shaft 30 below and parallel to the stationary chopping element 90, for instance. The encoder disk 28 rotates below the stationary chopping element 90.

Figure 4C:
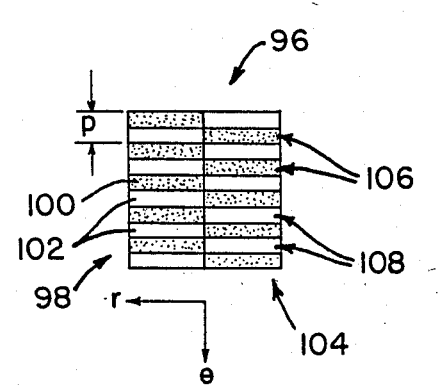

FIG. 4c shows a detail view of the encoded track 96 on the surface of the rotable encoder disk 28 of FIG. 4a. Θ represents the direction of rotation and "r" represents the radial direction of the encoder disk 28.

The encoded track 96 comprises a first pattern 98 of optical segments in a light path carrying a reference signal and a second pattern 104 of optical segments in a light path carrying an information signal. The first and second patterns 98 and 104 alternately carry the reference signal and information signal depending on the rotational position of the encoder disk 28 relative to the stationary chopping element 90.

The reference pattern 98 comprises opaque regions 100 and transmissive regions 102. Ideally, these regions are perfectly opaque and perfectly transmissive, respectively. The transmissive regions 102 transmit the reference signal. The opaque and transmissive regions 100 and 102 are shown rectangular for simplicity, but comprise sectors having a uniform period "P". These regions 100 and 102 extend radially from the rotatable encoder shaft 30.

The information pattern 104 comprises opaque regions 106 and transmissive regions 108. Ideally, the opaque regions 106 are perfectly opaque. However, the regions 108 are variably transmissive and transmit the information signal. For instance, the transmissivity of one region 108 is greater than that of an adjacent region 108 in the direction of Θ of FIG. 4c. The opaque and transmissive regions 106 and 108 are shown rectangular for simplicity, but comprise sectors having a uniform period "P". These regions extend radially from the rotatable encoder shaft 30. Alternatively, each variably transmissive region 108 is gray-scaled to vary in transmissivity within such a region. The opaque regions in 104 are shifted by half a period from the segments in 98.

The stationary chopping element 90 transmits light through the reference pattern 98 or the information pattern 104 according to the position of the encoder disk 28. For simplicity, the rotatable encoded track 96 is considered to be not rotating. Each variably transmissive region 108 of the encoded track 96 of FIG. 4c is aligned under each opaque region 92 of the stationary chopping element 90 of FIG. 4b. In this case, light comprising a reference signal is only transmitted through the completely transmissive regions 94 of the stationary chopping element 90 and through the completely transmissive regions 102 of the reference pattern 98. The reference signal by-passes the information pattern 104 on the encoder disk 28. All other light from the collimating lens 26 is blocked by the opaque regions 92 of the stationary chopping element 90 and opaque regions 106 of the encoding track 104.

Mechanical noise of an aircraft is sufficient to rotate the encoder disk 28 in the direction of Θ the one-half period "P", for instance. Alternatively, the encoder disk 28 is dithered so the transmission of light is changed from one path to another such that at least one reference signal value and one information signal value are received by the microprocessor 38. After such rotation of the encoder disk 28, light comprising an information signal is transmitted only through the completely transmissive regions 94 of the stationary encoding element 90 and through the variably transmissive regions 108 of the information pattern 104. All other light from the collimating lens 26 is blocked by the opaque regions 92 of the stationary chopping element 90 and the opaque regions 102 of the reference pattern 98.

A collecting lens 34 focuses light passing through the stationary chopping element 90 and the completely transmissive regions 102 or the variably transmissive regions 108 of the encoder disk 28 onto an optical fiber 36 which carries this light to a detector 24. The optical fiber 36 carries an alternating signal comprising the reference signal and the information signal, which are alternately transmitted by the stationary chopping element 90 through the reference pattern 98 or the information pattern 104 on the encoding disk 28. A detector, similar to the detector 24 of FIG. 1a, alternately senses the reference signal and the information signal. The detector produces an output signal relating to these signals. The microprocessor 38 of FIG. 1a receives this output signal and derives the angular position of a wing flap in light of this signal.

Figure 4D:
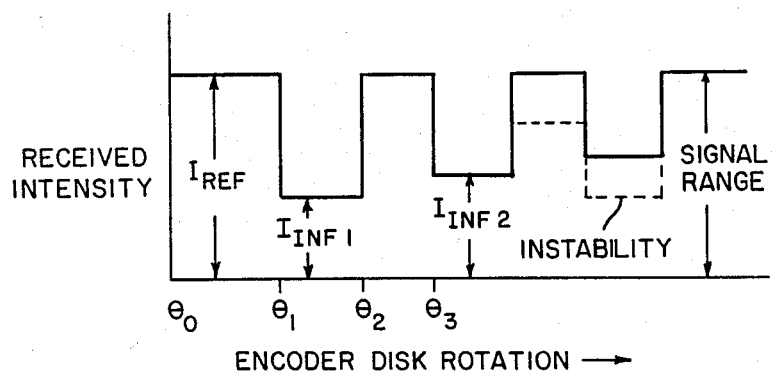

FIG. 4d illustrates the relative intensities of the reference signal and the information signal produced by the optical resolver of FIG. 4a. The angle of rotation Θ of the encoder disk 28 is plotted on the horizontal axis and intensity of these signals is plotted on the vertical axis.

The encoder disk 28 is positioned at angle $\Theta_0$ and light is transmitted through the completely transmissive regions 94 and 102. This reference signal has a constant intensity $I_{Ref}$ if there is no instability in the light source, or fiber link loss.

At angle $\Theta_1$, the encoder disk 28 has rotated one-half period "P". The reference signal is now blocked by the opaque regions 92 of the stationary chopping element 90 and the opaque regions 100 of reference pattern 98. However, light comprising the information signal $I_{Inf}$ is transmitted by the completely transmissive regions 94 of the stationary chopping element 90 and through the variably transmissive regions 108 of the information pattern 104. For simplicity, the change in intensity from $I_{Ref}$ to $I_{Inf1}$ at $\Theta_1$ is shown as an instantaneous change. The curve of FIG. 4d is actually somewhat rounded with flat top and bottom portions. Rotation of the encoder disk 28 continues the remainder of the period "P". At $\Theta_2$, the completely transmissive regions 94 of the stationary chopping element 90 are again aligned over the completely transmissive regions 102 of the reference pattern 98 and received intensity returns to $I_{Ref}$.

The encoding disk 28 continues to rotate to $\Theta_3$, when variably transmissive regions 108 having greater transmissivity align under the transmissive regions 94 of the stationary chopping element 90. The greater transmissivity of these regions 108 permits a greater transmission of light to the collecting lens 34 and thus the intensity of the information signal increases to $I_{Inf2}$. Intensity of the information signal increases as a step function because each variably transmissive region 108 has a density which varies relative to an adjacent variably transmissive region 108. Instability of a light source or fiber link losses would shift the signals $I_{Ref}$ and $I_{Inf}$ to the dashed line of FIG. 4d, in a manner similar to that described concerning the graph of FIG. 1d.

FIG. 5 illustrates the steps performed by a microprocessor in deriving a position of an object using the optical resolver according to this invention.

At 110, the microprocessor 38 of FIG. 1a reads the power of the output signal from a detector, such as the detector 24 of FIG. 1a. The output signal from such a detector relates alternately to the reference signal and information signal. The cycle time of the microprocessor 38 in reading sequential values of detected power is much less than the time required for the encoder disk to rotate one resolution step.

At 112, the microprocessor 38 derives the average power of sequential output signals from the detector over many cycle times. The microprocessor 38 stores the most recent values of detected power in memory comprising a first-in-first-out stack of ten registers, for instance. Because the microprocessor 38 cycles so quickly, these ten registers store the ten most recent values of detected power within one resolution step of the encoder disk 28, for instance. The microprocessor 38 sums these stored values of detected power and divides by the number of registers to derive average power.

At step 114, the microprocessor 38 determines if the average power derived at 112 is within a predetermined range of a maximum power value $P_R$ which relates to the intensity of the previously determined reference signal. Specifically, the microprocessor 38 determines if the absolute value of the difference between the average power and the maximum power is less than a predetermined value δ that relates to a step of resolution in the encoder disk 28. Maximum power $P_R$ is updated in small increments while the microprocessor 38 searches for a value representing the maximum intensity of the reference signal. At 116, if the absolute value of the difference between average power and maximum power is less than the step of resolution δ, the maximum power, which had been initialized in another register, is set to equal the average power derived at 112.

However, if the difference between average power and maximum power is greater than or equal to δ, the average power may be approaching a minimum power value $P_I$ which relates to the intensity of the information signal. At 118, the microprocessor 38 determines if average power is within a predetermined range of the minimum power $P_I$. At 120, if the absolute value of the difference between average power and minimum power is less than a step of resolution δ, the minimum power, which had been initialized in another register, is set to equal the average power derived at 112. If the absolute value of the difference between average power and minimum power is greater than δ, average power may be approaching maximum power. In this case, the microprocessor 38 continues to read detector power at step 110. The cycle time of the microprocessor 38 in reading sequential values of detector power is much less than the time required for maximum power or minimum power to change a step of resolution δ.

At 122, the microprocessor 38 derives the angular position of the encoder disk 38 in light of current values of $P_R$ and $P_I$. Transmissivity T of the analog track 32 on the encoder disk is greater than 0 and less than 1, and is defined by:

$$T = (T_{MIN} + (\Theta - \Theta_0)K) \quad (1)$$

where $T_{MIN}$ is minimum transmissivity; $\Theta$ is the present angle of the encoder disk; $\Theta_0$ is an initial angle of the encoder disk 28 where $T = T_{MIN}$; and K represents an encoder track constant relating to the density of material on an analog track.

Detector power $P_I$ relates to the information signal and is defined by:

$$PI = \alpha(T_{MIN} + (\Theta - \Theta_0)K)\beta\gamma_I P \quad (2)$$

where $\alpha$ and $\beta$ represent the transmissivity of optical fiber 18 from a light source to the optical encoder, and fiber 19 from the optical encoder to a detector, respectively; and $\gamma_I$ represents transmissivity through regions 94 of the chopping disk and regions 108 of varying transmissivity when $T = 1$; and P equals power launched into the fiber 18. is defined by:

$$P_R = \alpha\beta\gamma_R P \quad (3)$$

where $\gamma_R$ represents transmissivity of a reference signal through transmissive regions 94 of the chopping disk 90 and clear segments 102 of the encoder disk 28.

$\Theta$ is derived from the equations (1), (2), and (3).

$\Theta$ is derived from the equations (1), (2), and (3).

$$\Theta = \frac{1}{K}\left(\frac{P_r}{P_R} \cdot \frac{\alpha_R}{\alpha_I} - T_{MIN}\right) + \Theta_0$$

$\Theta$ represents the angular position of the encoder disk 28 and, thus, the position of a wing flap on an aircraft, for instance.

This optical resolver provides an information signal for indicating the position of an object and a reference signal for compensating for any instability in intensity of a light source or fiber link losses. The optical resolver of FIGS. 1a, 2a, 3, and 4a can comprise a linear optical encoder. An analog track is deposited on an encoder slide of a linear optical encoder, and a chopping slide is provided between the encoder slide and a collimating lens, for instance. The optical source 14 and detector 24 can be interchanged. The encoder disk 28 and chopping disk 44 can be moved separately by gears and at different velocities if necessary instead of directly by the encoder shaft 30.

We claim:

1. An optical encoder comprising:
   a movable element having a means for modulating light comprising a variably transmissive material on the movable element;
   a means for alternately transmitting light through a first path which by-passes the variably transmissive material and a second path which includes the variably transmissive material.

2. The encoder of claim 1, the means for transmitting light comprising an optical switch.

3. The encoder of claim 2, the second path comprising a means for directing light through the means for modulating light.

4. The encoder of claim 3, the movable element comprising a rotatable encoder disk and a rotatable shaft connected to rotate with the rotatable encoder disk.

5. The encoder of claim 4, the first path comprising a fiber which by-passes the means for modulating light.

6. The encoder of claim 1, the means for alternately transmitting light comprising a chopping element connected for movement with the movable element.

7. The encoder of claim 6, the movable element comprising an optically clear portion;
   the first path comprising a means for directing light through the chopping element and the optically clear portion of the movable element.

8. The encoder of claim 7, the second path comprising a means for directing light through the chopping element and the means for variably transmissive material.

9. The encoder of claim 8, the means for modulating light comprising an analog track on the movable element.

10. The encoder of claim 9, the chopping element comprising an alternating series of opaque segments and transmissive segments.

11. The encoder of claim 10, the movable element comprising a rotatable encoder disk and a rotatable shaft connected to rotate with the rotatable encoder disk, and the chopping element comprising a chopping disk rotatable with the rotatable encoder disk.

12. The encoder of claim 11, the means for directing light comprising an optical fiber having two branches which are respectively staggered over one opaque segment and one transmissive segment of the chopping element.

13. The encoder of claim 6, wherein the chopping element comprises a first optically clear portion, and the first path comprises the first optically clear portion of the chopping element, and wherein the encoder also comprises a means for receiving light from the first optically clear portion of the chopping element and directing the light into the first and second paths.

14. The encoder of claim 13, the movable element having a second optically clear portion, the second path comprising the second optically clear portion of the movable element and the means for modulating light on the movable element.

15. The encoder of claim 14, the chopping element comprising an alternating series of opaque segments and transmissive segments.

16. The encoder of claim 15, the means for directing light comprising a beam splitter.

17. The encoder of claim 16, the means for modulating light comprising an analog track on the movable element.

18. The encoder of claim 17, the movable element comprising a rotatable encoder disk and a rotatable shaft connected to rotate with the rotatable encoder disk, and the chopping element comprising a chopping disk rotatable with the rotatable encoder disk.

19. The encoder of claim 1, the means for alternately transmitting light comprising a stationary element.

20. The encoder of claim 19, the stationary element comprising a surface with an opaque region and a transmissive region, the movable element comprising a surface parallel to the stationary element having opaque regions and transmissive regions, and the first path comprising the transmissive regions of the stationary element and the movable element.

21. The encoder of claim 20, the movable element comprising a surface having variably transmissive regions, and the second path comprising the transmissive regions of the stationary element and the variably transmissive regions of the movable element.

22. The encoder of claim 21, the movable element comprising a rotatable encoder disk and a rotatable shaft connected to rotate with the rotatable encoder disk.

* * * * *